US011392751B1

(12) United States Patent
Szarvas et al.

(10) Patent No.: US 11,392,751 B1
(45) Date of Patent: Jul. 19, 2022

(54) ARTIFICIAL INTELLIGENCE SYSTEM FOR OPTIMIZING INFORMATIONAL CONTENT PRESENTATION

(71) Applicant: Amazon Technologies, Inc., Seattle, WA (US)

(72) Inventors: Gyuri Szarvas, Berlin (DE); Bryn Savage, Seattle, WA (US); Kevin Michael Small, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1262 days.

(21) Appl. No.: 15/831,008

(22) Filed: Dec. 4, 2017

(51) Int. Cl.
G06F 40/106 (2020.01)
G06N 3/04 (2006.01)
G06N 3/08 (2006.01)
G06Q 30/02 (2012.01)
G06Q 10/08 (2012.01)

(52) U.S. Cl.
CPC ......... *G06F 40/106* (2020.01); *G06N 3/0436* (2013.01); *G06N 3/0454* (2013.01); *G06N 3/08* (2013.01); *G06Q 10/087* (2013.01); *G06Q 30/0277* (2013.01)

(58) Field of Classification Search
None
See application file for complete search history.

(56) References Cited

U.S. PATENT DOCUMENTS

| | | |
|---|---|---|
| 6,266,649 B1 | 7/2001 | Linden et al. |
| 6,782,370 B1 | 8/2004 | Stack |
| 7,295,995 B1 | 11/2007 | York et al. |
| 7,542,951 B1 | 6/2009 | Chakrabarti et al. |
| 7,584,159 B1 | 9/2009 | Chakrabarti et al. |
| 7,590,562 B2 | 9/2009 | Stoppelman |
| 7,668,821 B1 | 2/2010 | Donsbach et al. |
| 7,783,528 B2 | 8/2010 | Musgrove et al. |
| 7,809,601 B2 | 10/2010 | Shaya et al. |
| 7,908,183 B2 | 3/2011 | Jacobi et al. |
| 8,090,621 B1 | 7/2012 | Chakrabarti et al. |
| 8,301,623 B2 | 10/2012 | Chakrabarti et al. |
| 8,452,797 B1 | 5/2013 | Paleja et al. |
| 8,468,164 B1 | 6/2013 | Paleja et al. |
| 8,510,247 B1 | 8/2013 | Kane, Jr. et al. |

(Continued)

OTHER PUBLICATIONS

U.S. Appl. No. 15/861,496, filed Jan. 3, 2018, Prashant Verma et al.

(Continued)

*Primary Examiner* — Evren Seven
(74) *Attorney, Agent, or Firm* — Robert C. Kowert; Kowert, Hood, Munyon, Rankin & Goetzel, P.C.

(57) ABSTRACT

At an artificial intelligence system, a baseline set of informational content elements pertaining to an item for presentation to one or more potential item consumers is identified. One or more optimization iterations are implemented. In a particular iteration, a data set comprising interaction records of a target audience with the baseline set and with one or more variants of the baseline set is collected. Using the data set as input to a machine learning model, effectiveness metrics of the different informational elements are determined. A particular content element set to be presented to an audience is identified using the effectiveness metrics.

21 Claims, 12 Drawing Sheets

(56) References Cited

U.S. PATENT DOCUMENTS

2015/0262286 A1* 9/2015 Cypher .............. G06Q 50/01
  705/26.61
2019/0114566 A1* 4/2019 Lapierre ............ G06Q 10/087

OTHER PUBLICATIONS

AWS, "Amazon Machine Learning Developer Guide Version Latest", Copyright 2017 Amazon Web Services, pp. 1-146.
Karol Gregor, et al., "DRAW: A Recurrent Neural Network for Image Generation", Proceedings of the 32nd International Conference on Machine Learning; JMLR: W & CP, vol. 37, pp. 1-10.
Zachary C. Lipton, et al., "Generative Concalenalive Nels Jointly Learn to Write and Classify Reviews", arXivprepring arXiv: 1511.03683, pp. 1-11.
Wikipedia, "Multi-armed bandit", Retrieved from URL: https://en.wikipedia.org/wiki/Multiarmed_bandil on Jul. 11, 2017, pp. 1-13.
Diederik P. Kingma and Jimmy Lei Ba, "ADAM: A Method for Stochastic Optimization," Published as a conference paper at ICLR 2015, Jul. 23, 2015, pp. 1-15.
David Bamman, Ted Underwood and Noah A. Smith, "A Bayesian Mixed Effects Model of Literary Character," Proceedings of the 52nd Annual Meeting of the Association for Computational Linguistics, pp. 370-379, Baltimore, Maryland, USA, Jun. 23-25, 2014. c2014 Association for Computational Linguistics.
David Bamman, Brendan O'Connor and Noah A. Smith, "Learning Latent Personas of Film Characters," Proceedings of the 51st Annual Meeting of the Association for Computational Linguistics, pp. 352-361, Sofia, Bulgaria, Aug. 1-9, 2013. c2013 Association for Computational Linguistics.
David Bamman and Noah A. Smith, "Unsupervised Discovery of Biographical Structure from Text," http://dumps.wikimedia.org/enwiki/20140102/enwiki-20140102-pages-articles.xml.bz2, 2014, pp. 1-13.
Micha Elsner, "Character-based Kernels for Novelistic Plot Structure," Proceedings of the 13th Conference of the European Chapter of the Association for Computational Linguistics, pp. 634-644, Avignon, France, Apr. 23-27, 2012. c2012 Association for Computational Linguistics.
Yaroslav Ganin and Victor Lempitsky, "Unsupervised Domain Adaptation by Backpropagation," Proceedings of the 32nd International Conference on Machine Learning, Lille, France, 2015. JMLR: W&CP vol. 37. Copyright 2015 by the author(s), pp. 1-10.
Jeffrey Pennington, Richard Socher and Christopher D. Manning, "GloVe: Global Vectors for Word Representation," Oct. 25, 2014, pp. 1-12.
Mohit Iyyer, Anupam Guha, Snigdha Chaturvedi, Jordan Boyd-Graber, and Hal Daum'e III, "Feuding Families and Former Friends: Unsupervised Learning for Dynamic Fictional Relationships," 2016, pp. 10-11.
David M. Blei, Department of Computer Science Princeton University "Probabilistic Topic Models," Aug. 22, 2011, pp. 1-176.
Yoav Goldberg, "A Primer on Neural Network Models for Natural Language Processing," Draft as of Oct. 5, 2015, Journal of Artificial Intelligence Research 57 (2016) pp. 345-420.
Diego Marcheggiani and Ivan Titov, "Discrete-State Variational Autoencoders for Joint Discovery and Factorization of Relations," Transactions of the Association for Computational Linguistics, vol. 4, pp. 231-244, 2016. Action Editor: Sebastian Riedel Submission batch: Oct. 2015; Revision batch: Feb. 2016; Published Jun. 2016. 2016 Association for Computational Linguistics. Distributed under a CC-BY 4.0 license.
U.S. Appl. No. 14/581,555, filed Dec. 23, 2014, Wainwright Gregory Siady Yu.
U.S. Appl. No. 14/581,546, filed Dec. 23, 2014, Wainwright Gregory Siady Yu.
"Who are you shopping for?", downloaded from https://www.amazon.com/gp/gift-finder?ageGroup=adult-neutral&showBubbles=true on Aug. 13, 2017, pp. 1-6.
U.S. Appl. No. 15/474,992, filed Mar. 30, 2017, Szarvas, et al.
U.S. Appl. No. 15/688,681, filed Aug. 28, 2017, Weiwei Cheng.

* cited by examiner

ARTIFICIAL INTELLIGENCE SYSTEM FOR OPTIMIZING INFORMATIONAL CONTENT PRESENTATION

BACKGROUND

Many content providers, such as e-retail organizations or libraries which sell, lend or stream content items such as books, periodicals, motion pictures and the like, may have large inventories comprising millions of items. In order to attract consumers for the content items, a number of interfaces may be used to present collateral information about the items—e.g., excerpts from reviews may be presented, images of book covers or authors may be presented, and so on. Furthermore, such informational content may be presented in a number of different contexts—e.g., as part of a recommendation, in response to a search request, in an advertisement, and so on.

For many inventory items, numerous versions may be available from a given e-retailer or similar organization. For example, in the case of books, multiple editions published over the years may be available; for motion pictures, DVD and Blu-Ray editions may be available, released-to-theater and director's cuts may be available, and so on. In some cases, multiple different versions of the same underlying logical collateral elements may be available for presentation—e.g., different editions of a book may have respective covers, sets of critics' reviews, customer reviews, and so on. The different versions may vary in their ability to attract potential consumers of the corresponding content items—e.g., depending on the type of book and its intended audience, a book cover with a vividly colored, visually striking combination of images and text may be much more successful at increasing sales than a dull single-colored cover.

In today's competitive environment, increasing the probability that a given potential customer for a given content item actually purchases or consumes the item can, when aggregated over millions of items and millions of customers, have a significant impact on the organization providing the items. Selecting the appropriate set of informational content to increase such probabilities may present a non-trivial technical challenge.

Figure 1:
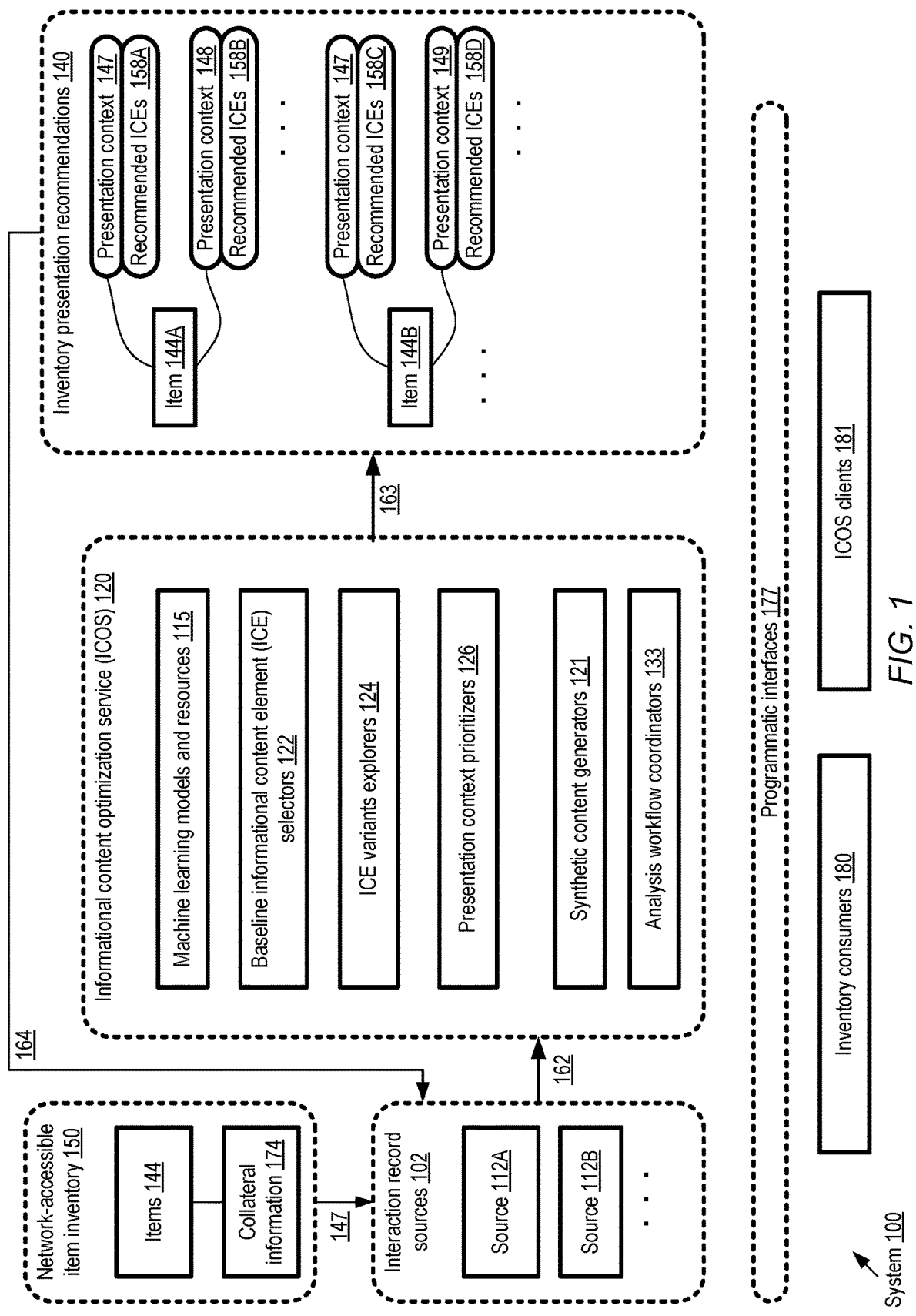
FIG. 1 illustrates an example system environment in which machine-learning based techniques for optimizing the presentation of informational content for items of an inventory may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for optimizing the effectiveness of the presentation of informational content associated with inventory items are described. The term "informational content element" or ICE associated with an inventory item may be used in various embodiments to refer to an artifact, such as an image, a video, a few phrases or a paragraph of text, etc. which in some way describes the item or conveys some information pertaining to the item, in a way that may be useful to potential consumers of the item in deciding whether they wish to consume (e.g., purchase or lease) the item. In at least some embodiments, one or more of the techniques described herein may be employed at a large-scale content provider such as an e-retailer which an inventory comprising millions of items, where for at least some of items, numerous choices for ICEs such as different versions of images of various aspects of the items (e.g., different cover images for respective editions of a book), text sequences such as reviews, news items pertaining to items (such as rewards or reward nominations for books, films, etc.) and so on may be available. Furthermore, for at least some of the items, multiple presentation contexts may be usable to display or indicate the ICEs in various embodiments—e.g., one or more recommendation-related interfaces may be available, various types of search result interfaces may be implemented, an overview or item summary web page may be generated for each item, a details page may be generated, and so on. In the e-retail environment, the various presentation contexts may, for example, be encountered during a navigation of a web site which can potentially conclude with the purchase (or borrowing/leasing) of the items.

At a high level, the content presentation optimization methodology may be summarized as follows for at least some embodiments. For a given item of an inventory, a baseline set of one or more informational content elements may first be identified for presentation in at least some presentation context. A number of different techniques may be used to identify the baseline set in different embodiments—e.g., a canonical or most-recently-generated set of ICEs may be used, a machine learning model may be trained to predict an effective combination of ICE features using records of earlier consumer interactions with ICEs, a random collection of ICEs may be selected from among the available ICEs, and so on. After the baseline set has been identified, one or more optimization iterations may be conducted in some embodiments using a machine learning model operating in an online or continuous learning mode. In effect, the baseline set may serve as a "prior" with respect to which iterative experiments involving tradeoffs between exploration and reward exploitation may be performed in various embodiments. In a given iteration one or more variants of the (current) baseline set may be presented to targeted audiences, and the effectiveness or utility of different ICEs may be learned based on the responses of the target audiences. Using the learned effectiveness measures, the set of ICEs to be presented to one or more potential consumers of the item may be adjusted, in effect resulting in the identification of a new baseline for the next optimization iteration in various embodiments. The optimization iterations may be continued in some embodiments, with the effectiveness of additional ICE variants being estimated in each iteration, until some termination criterion is met. The termination criteria may, for example, include determining that the marginal improvements in effectiveness being achieved by the variants has plateaued, that the overall consumption rate of the set of items for which ICE presentation is being optimized has fallen below some threshold which renders further optimizations inessential, and so on. In effect, the benefits of presenting various individual versions or variants of ICEs may be learned dynamically in an ongoing process, enabling the provider of the inventory to adjust to potentially changing trends in consumer behavior in at least some embodiments.

The exploration of the presentation space and the associated optimization may be performed in some embodiments using so-called "bandit" machine learning models and algorithms, such as a contextual bandit algorithm or other similar state-dependent adaptive trial algorithms. In a contextual bandit algorithm which may be employed in one embodiment, a multi-dimensional feature vector called a context vector may be generated from the available ICE choices. When making a particular choice for ICE recommendations in a given optimization iteration, the context vector and the rewards/losses corresponding to past choices may be analyzed, with the tradeoffs between exploration (the extent of changes made to the previously-presented sets of ICEs) and exploitation (maximization of rewards) being taken into account in such an embodiment. Over time, the bandit algorithm may examine enough information obtained from the ongoing collection of records of interactions with the ICEs to learn relationships among the rewards and the context vector elements, and may therefore be able to select more effective ICEs quickly and efficiently in various embodiments. Other optimization algorithms, including for example neural network-based reinforcement learning algorithms/models, may be employed in different embodiments.

According to some embodiments, a system may comprise one or more computing devices of a network-accessible artificial intelligence service, e.g., a service implemented at a provider network or cloud computing environment. A set of records pertaining to previous sales or consumption of various items of an inventory (e.g., via web-based interfaces or other types of network access) over some period of time (e.g., months or years) may be available for analysis by the service in at least some embodiments. Individual ones of the records may indicate, for example, the kinds of ICEs which were presented corresponding to various sales or item consumption events (consumption events which may not necessarily comprise sales may comprise, for example, subscription-based streaming of content, borrowing of items, and so on). The computing devices may train, using such records of earlier interactions, a first machine learning model to generate respective effectiveness scores of different ICE features (e.g., characteristics such as color content, text font and layout etc. of different book cover images) in one or more presentation contexts (e.g., a recommendation context, an item overview web page, etc.). In some embodiments, the first machine learning model may also or instead be trained to generate respective effectiveness scores for ICE categories (e.g., images versus reviews) and/or individual instances of ICEs. Using a trained version of the first machine learning model, a baseline set of informational content elements pertaining to a particular item may be identified in at least some embodiments. The baseline set may be identified for presentation to one or more potential item consumers in a particular presentation context, and may for example comprise a first version of a first ICE (e.g., a particular image of a book's cover) selected from among a plurality of versions of the first ICE.

In at least one embodiment, starting with the baseline set of ICEs identified using the first machine learning model, one or more presentation optimization iterations may be performed. In a first such presentation optimization iteration, a new data set comprising records of interactions, in at least one presentation context, of a target audience with (a) the baseline set and (b) one or more variants of the baseline set may be obtained. A particular variant may, for example, comprise a second version of the first informational content element. The new data set may be provided as input to a second machine learning model operating in an online or continuous learning mode, from which respective effectiveness metrics corresponding to various ICEs included in the variants may be determined. Using the output of the second model, adjustments may be made to the set of ICEs presented to various target audience members for the next optimization iteration in some embodiments.

In at least some embodiments, one or more of the ICEs presented to potential item consumers may be synthesized or created de novo—that is, a content generator tool such as a generative neural network-based machine learning model may be trained to generate ICEs (such as images) which are likely to be more effective in attracting item consumers than the available set of ICEs for a given item. In at least one embodiment, a synthetic ICE generator tool may be employed, when, for example, insufficient ICEs of a particular type are available from the original producers or vendor of the corresponding item. In some embodiments, a training data set for a synthetic content generation tool may comprise a provided list of features of an item I and example ICEs (e.g., for other items) with desirable characteristics.

In one embodiment, as mentioned earlier, the initial baseline set of ICEs may be selected without utilizing a machine learning model. For example, a default rule for selecting among various versions of an ICE such as a book cover image may indicate that the most recent version should be used in some embodiments. In another example, random selection from among the population of available ICEs may be used to populate an initial baseline set. In some embodiments in which machine learning models are used for baseline ICE set identification as well as variant exploration, optimal or near-optimal combinations of ICEs may at least in some cases be identified more quickly than if the baselines were identified without using machine learning—that is, the first phase of machine learning may "boost" the second phase by allowing optimization iterations to begin nearer to a true optimum. In one embodiment, machine learning may be used for baseline ICE set identification, and the results achieved using the baseline may be sufficient that no further optimization iterations are performed—that is, the use of machine learning may be confined to baseline ICE set identification in such embodiments.

Respective sets of optimization iterations may be conducted in some embodiments for each of several presentation contexts for a given item. Examples of the different presentation contexts for ICEs may include recommendation contexts, search result contexts, item overview contexts, item details contexts, advertisements using different types of messaging mechanisms such as e-mails, social media tools, flyers, newspapers and the like. In some embodiments, a voice context may be used for presenting at least some ICEs—e.g., review excerpts may be provided by a voice-driven assistant device or another Internet-of-Things (IoT) device. Categories of ICEs which may be presented in one or more contexts may include, among others, still images, videos, audio recordings, text collections, web links, and so on. In some embodiments in which several different presentation contexts are available for a given item, the different contexts may be prioritized relative to one another—e.g., if far more consumers purchased an item as a result of viewing a recommendation than as a result of viewing an item details page, the optimization of the recommendation interface may be prioritized higher than the optimization of the details page. Records of earlier interactions performed for similar items (or the same item) in the different contexts may be analyzed to prioritize among contexts in such embodiments.

In various embodiments, different types of effectiveness or utility metrics may be generated for ICEs at the machine learning models used (e.g., either during the iterative optimization phase, or during the identification of the baseline sets of ICEs). Such metrics may include, for example, web link click count metrics, sales metrics, shopping cart insertion metrics, wish list insertion metrics, and/or session engagement length metrics.

In one embodiment, any of a number of granularities corresponding to respective target audiences of item consumers may be selected for optimizing the presentation of ICEs. The granularity levels may include, for example, global granularity (where all possible consumers are considered), group granularity (e.g., for potential consumers with some shared demographic or geographic characteristics), or individual granularity (for a single individual). Depending on the selected granularity, the set of interaction records collected during the optimization iterations, and the duration for which the interactions are monitored or tracked for a given iteration, may change. For example, in the case of a group granularity of approximately a hundred individuals with some common demographic property, it may take more time to accumulate enough observations for N different variants of an ICE set than if a global audience was targeted for optimization. Of course, as the size of the group for which optimization is being attempted increases, the precision with which ICEs can be customized may decrease as well in various embodiments.

Example System Environment

FIG. 1 illustrates an example system environment in which machine-learning based techniques for optimizing the presentation of informational content for items of an inventory may be implemented, according to at least some embodiments. As shown, system 100 comprises various components of an informational content optimization service (ICOS) 120 which may be utilized by the owners/managers of a network-accessible item inventory 150 to attain various types of objectives associated with the inventory. The inventory 150 may comprise a large number of individual items 144 in some embodiments, for at least some subset of which collateral descriptive information 174 may be available. For example, a large online retailer may have an inventory comprising millions of items 144, and the collateral information 174 pertaining to a given item 144 may comprise a collection of informational content elements (ICEs) such as various versions or instances of still or video images, reviews, and so on. The ICEs may be presented (e.g., via visual interfaces such as web sites, audio interfaces and the like) to potential and actual consumers 180 of the items in various presentation contexts in the depicted embodiment, e.g., in response to programmatic requests (such as search requests) submitted via programmatic interfaces 177 or as part of advertisements/promotional messages targeted at consumers 180. The inventory owning organizations may keep track of the effectiveness of the presented ICEs, e.g., by logging information about interactions of the consumers 180 with various presentation interfaces, as indicated by arrow 147. Depending on the number of different presentation contexts used, a number of repositories or sources 102 of the interaction records may be available for potential analysis by the ICOS, such as source 112A or source 112B.

The ICOS 120 may comprise a plurality of component entities in various embodiments, individual ones of which may be implemented using a combination of software and hardware of one or more computing devices. For example, as shown, the service 120 may comprise some number of analysis workflow coordinators 133, machine learning models and resources 115, baseline ICE selectors 122, ICE variants explorers 124, presentation context prioritizers 126, and/or synthetic content generators 121 in the depicted embodiment.

The overall process of optimizing the presentation of the ICEs for various items 144 may be orchestrated by one or more analysis workflow coordinators 133 of the ICOS 120 in various embodiments. For example, such coordinators 133 may invoke or activate other components of the ICOS to determine baseline sets of ICEs for various items, select or generate (using synthetic content generators 121) variants of ICEs to be presented in an effort to learn about the effectiveness of different ICEs, and so on. In various embodiments, machine learning algorithms and resources 115 (e.g., computing devices which are optimized for machine learning tasks) may be employed at one or more stages of the optimization process, although the use of machine learning models may not be required for at least some stages of the optimization.

In some embodiments, data sets comprising records obtained from the interaction record sources 102 (as indicated by arrow 162) may be used as input to train a machine learning model to identify a baseline set of ICEs to be presented to some subset or all of inventory consumers 180 in one or more contexts for various items 144. Such a model may be trained to generate, corresponding to individual features of various available ICEs items 144, respective utility scores or presentation effectiveness scores for one or more presentation contexts in one embodiment. The baseline ICE selectors 122 may include the set of ICEs with features whose scores are highest, or whose scores exceed some threshold, in a baseline set for a given item and context. In other embodiments, the baseline ICE selectors 122 may identify baseline ICEs for at least some items without invoking a machine learning model—e.g., a set of heuristics or rules (such as the equivalent of "select the most recent version of an instance of each ICE category such as book cover images") may be used in some embodiments, or the baseline set of ICEs may be selected using random selection from among the available ICEs for an item.

Starting with a baseline set of ICEs for a context, an ICE variants explorer 124 may being optimization iterations in some embodiments. For example, in a given iteration, some number of modifications to a current baseline ICE set may be selected (or synthesized) for experimentation, and ICE sets representing such modifications may be presented to respective subsets of consumers 180 in one or more contexts. The effectiveness (as measured by various types of metrics such as sales rate, click-through rate on web links, add-to-shopping-cart rates, etc.) of various of ICEs may be determined, e.g., using a contextual bandit algorithm (or a similar optimization or machine learning model) in some embodiments. Based at least in part on the effectiveness results obtained for the different ICE variants tried, a recommendation may be generated in some embodiments for the set of ICEs which are to form the baseline for the next optimization iteration. In the next iteration, assuming that variants of the new baseline ICEs still remain to be explored, the effectiveness analysis may be repeated. Feedback based on consumer interactions with the different variants may be provided to the machine learning models being used for the optimization iterations in some embodiments. The models used for the optimization in such embodiments may operate in an online mode, in which new observations are analyzed and learned from as soon as they become available (as opposed for example to models which operate in batch mode, where a discrete learning or training phase may be followed by the execution of the model without continuous training/learning). A machine learning model used for iterative optimization may make tradeoffs between exploration (making more changes to the baseline, with potentially less predictable changes to effectiveness) and exploitation (maximizing the effectiveness of the presentation of the ICEs) in the depicted embodiment, eventually converging towards a set of recommended ICEs for a presentation context as indicated by arrow 163.

As shown in FIG. 1, a set of inventory presentation recommendations 140 generated using ICE variant exploration may indicate for example that for a particular item 144A, a first set of ICEs 158A should be used in context 147, while another set of ICEs 158B should be used in context 148. Similarly, for the combination (item 144B, presentation context 147), ICEs 158C may be recommended, and for the combination (item 144B, presentation context 149), ICEs 158D may be recommended in the depicted example scenario. It is noted that ICEs need not be recommended for the same set of presentation contexts for all items in at least some embodiments—for example, no recommendations may be generated for the context 148 for item 144B, and no recommendations may be generated for the context 149 for item 144A in FIG. 1. The relative importance of different presentation contexts may vary for different items in some embodiments; in at least some embodiments, some presentation contexts may not even be supported or implemented for a subset of items. In the embodiment depicted in FIG. 1, one or more presentation context prioritizers 126 may determine which particular presentation contexts should be considered candidates for ICE optimization for various items, and/or for deciding the order in which content presentation for those contexts should be optimized. In some embodiments, interaction records obtained from sources 102 may be used to determine the relevance of different contexts—e.g., if the sources indicate that for a particular item category, search results are far more frequently the path towards item purchases than recommendations, then the search results presentation context may be prioritized higher than recommendation contexts.

In at least some embodiments, one or more ICEs may be created at the ICOS for some items, e.g., instead of utilizing pre-existing ICEs provided by the producers/suppliers of the items. In some embodiments, as discussed below, synthetic content generators 121 comprising deep neural networks (DNNs) may be used to create the new ICEs. Synthetic ICEs may be included in baseline ICE sets and/or in the variant exploration phase in some embodiments.

In various embodiments, feedback resulting from the implementation of recommendations produced by the ICOS may be used to improve the accuracy of future recommendations (e.g., for subsequent iterations on behalf of a given item 144, or for newly introduced items). As indicated by arrow 164, interaction records corresponding to the recommendations 140 may be added to the sources 102, and may be analyzed on an ongoing basis by the ICOS components. In at least some embodiments, directives to initiate optimization for one or more items 144 may be submitted programmatically to the service 120 by ICOS clients 181, e.g., using a set of programmatic interfaces 177.

Informational Content Elements

Figure 2:
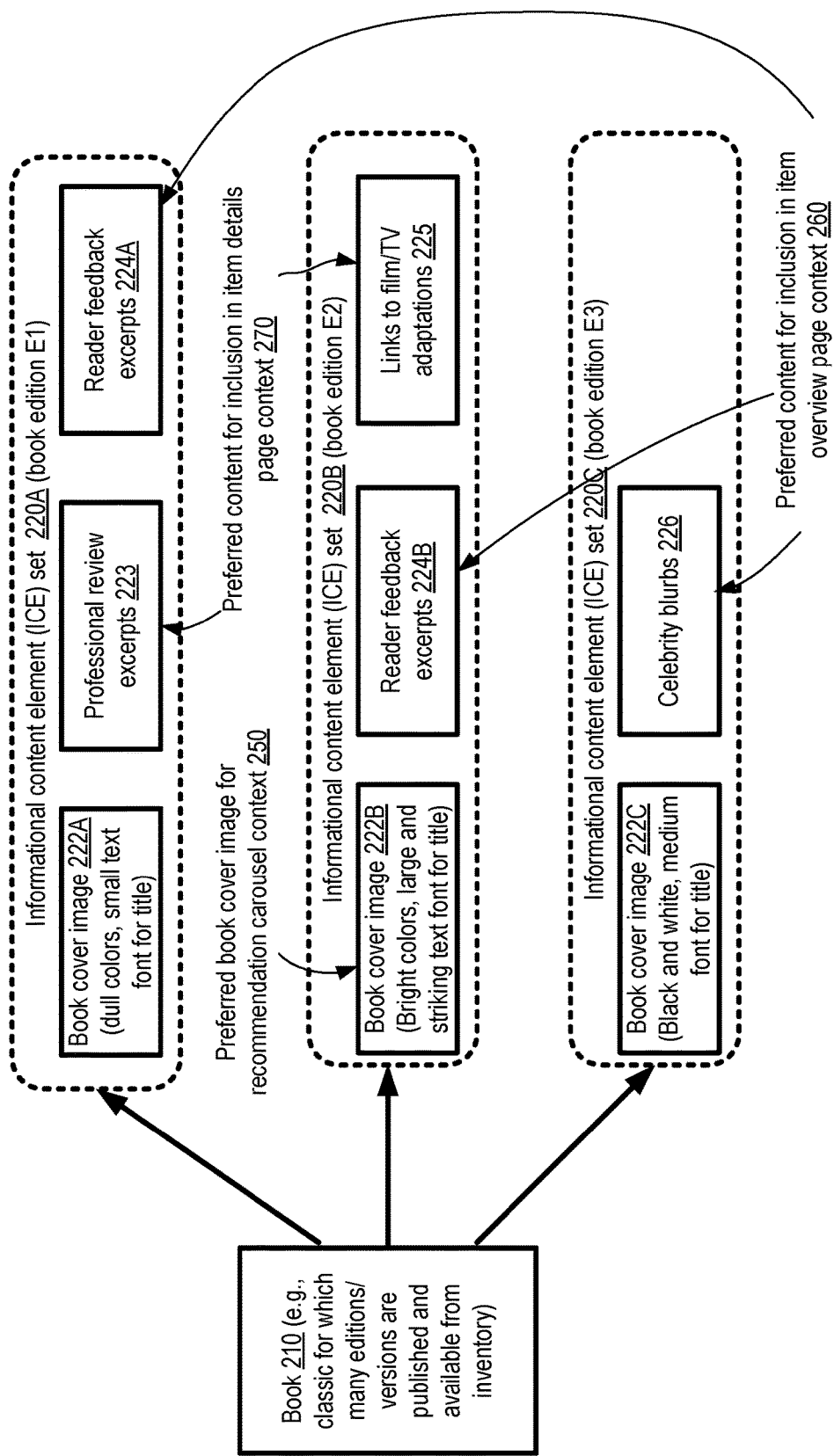
FIG. 2 illustrates examples of informational content elements pertaining to a book, according to at least some embodiments.

In various embodiments, the inventory for which ICE presentation optimization is performed may comprise books. FIG. 2 illustrates examples of informational content elements pertaining to a book, according to at least some embodiments. The book 210 may, for example, be a classic for which many different editions or versions are available in the inventory, even though the vast majority of the logical content of the book may not have changed from edition to edition. In some embodiments, all the different editions/versions may have the same unique "parent" item identifier within the databases used to manage the inventory comprising the book 210.

Corresponding to the different versions/editions of the book, respective sets of ICEs 220 may be available for presentation. ICE set 220A may comprise, for example, a first book cover image 222A, excerpts 223 from professional reviews of the book, and/or reader feedback excerpts 224A in the depicted embodiment, all pertaining to an edition E1 of the book 210. Corresponding to another edition E2, a different book cover image 222B and a different set of reader feedback excerpts 224B may be available as ICEs, together with a set of links 225 to television or film adaptations may be available as part of ICE set 220B. Finally, with respect to a different edition E3, a third version 222C of the book's cover and a set of celebrity blurbs 226 may be available as ICE set 220C.

Depending, for example, on the results of the analysis performed at an ICOS for book 210, different ones of the ICEs shown in FIG. 2 may be recommended for inclusion in one or more presentation contexts. For example, for a recommendation carousel 250 (a web-based interface in which respective images associated with various recommended items are provided and a potential consumer can move quickly back and forth among the images), book cover image 222B which contains bright colors, large and a title displayed in a large and visually striking font, may be predicted to be more effective than image 222A (with dull colors and a small font) or image 222C (with only black and white colors and a medium font). For an item overview web page context 260, reader feedback excerpts 224B and celebrity blurbs 226 may be recommended or preferred, while for a details web page pertaining to the book 210, professional review excerpts 223 and links to TV/film adaptations 225 may be preferred.

Figure 3:
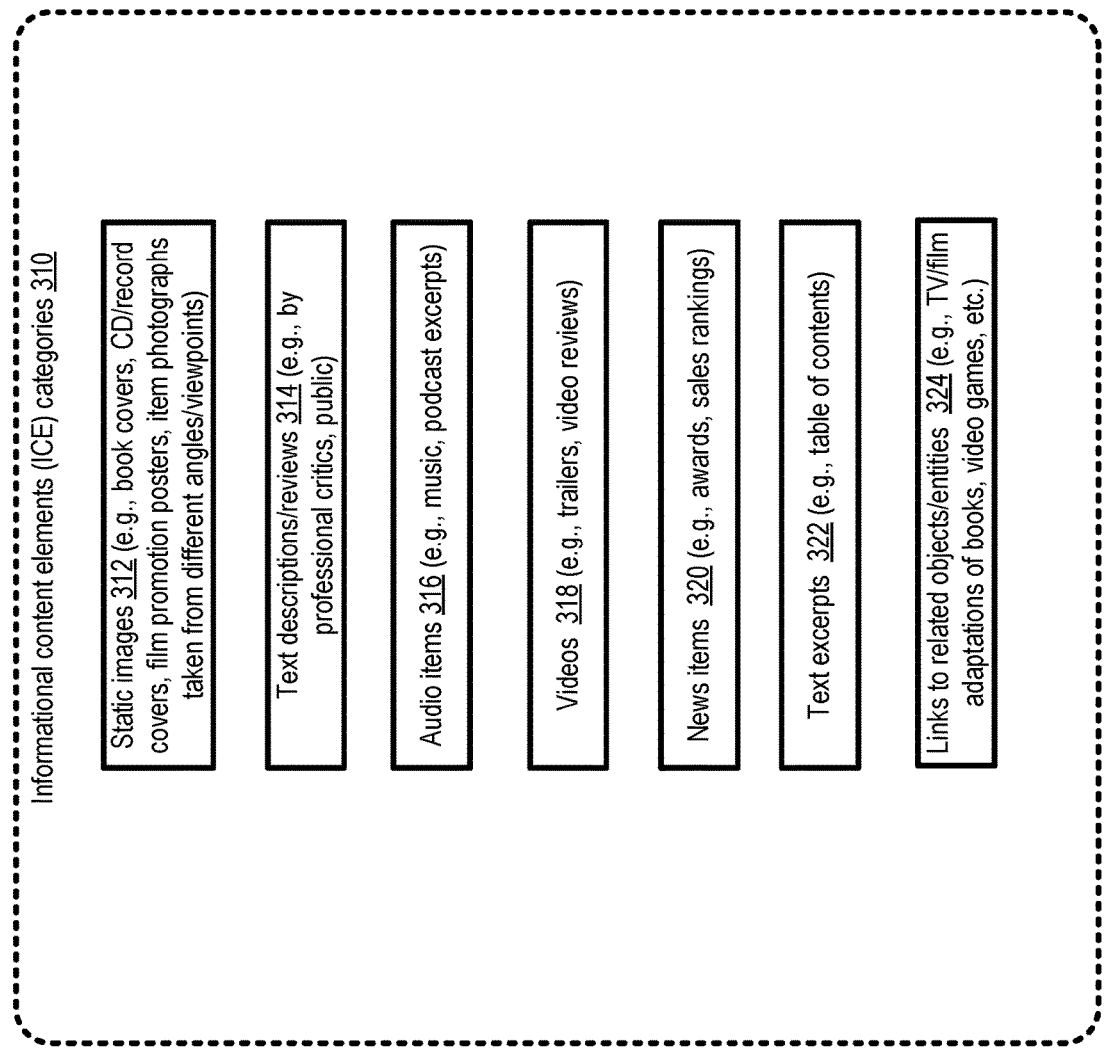
FIG. 3 illustrates example categories of informational content elements, according to at least some embodiments.

A wide variety of ICEs may be employed in some embodiments. FIG. 3 illustrates example categories of informational content elements, according to at least some embodiments. As shown, some ICEs 310 may comprise static images 312, such as book covers, CD/record covers in the case of music items, film promotion posters, item photographs taken from different angles/viewpoints and so on in the depicted embodiment. Other ICEs may comprise portions or all of text descriptions or reviews 314, which may be generated for example by professional critics or reviewers, and/or by members of the public. In some embodiments, audio items 316, such as excerpts of music, songs, advertising jingles, podcasts, and the like may be used as ICEs for some items.

In some embodiments, videos 318, e.g., trailers, video reviews and the like may be used to convey information about some items of an inventory. Features derived from videos 318 and static images 312 may collectively be referred to as image-based features in various embodiments. News items 320, such as awards granted to a given item, awards for which an item has been nominated, sales rankings published by trusted parties, etc. may be used as ICEs in some embodiments. For items comprising text, such as books, excerpts 322 of the items themselves may be used as ICEs in various embodiments. In at least one embodiment, links to related objects or entities 324, such as TV/film adaptations in the case of books, video games and the like may also be considered ICEs.

The particular combination of ICE categories may vary for different items of an inventory in different embodiments—that is, not all the items in a given inventory, or even with an item category, may have associated ICEs of the same categories. In at least some embodiments, one or more ICEs for an item may be generated or synthesized by the ICOS, instead of being provided by the producer/vendor of the item.

Figure 4:
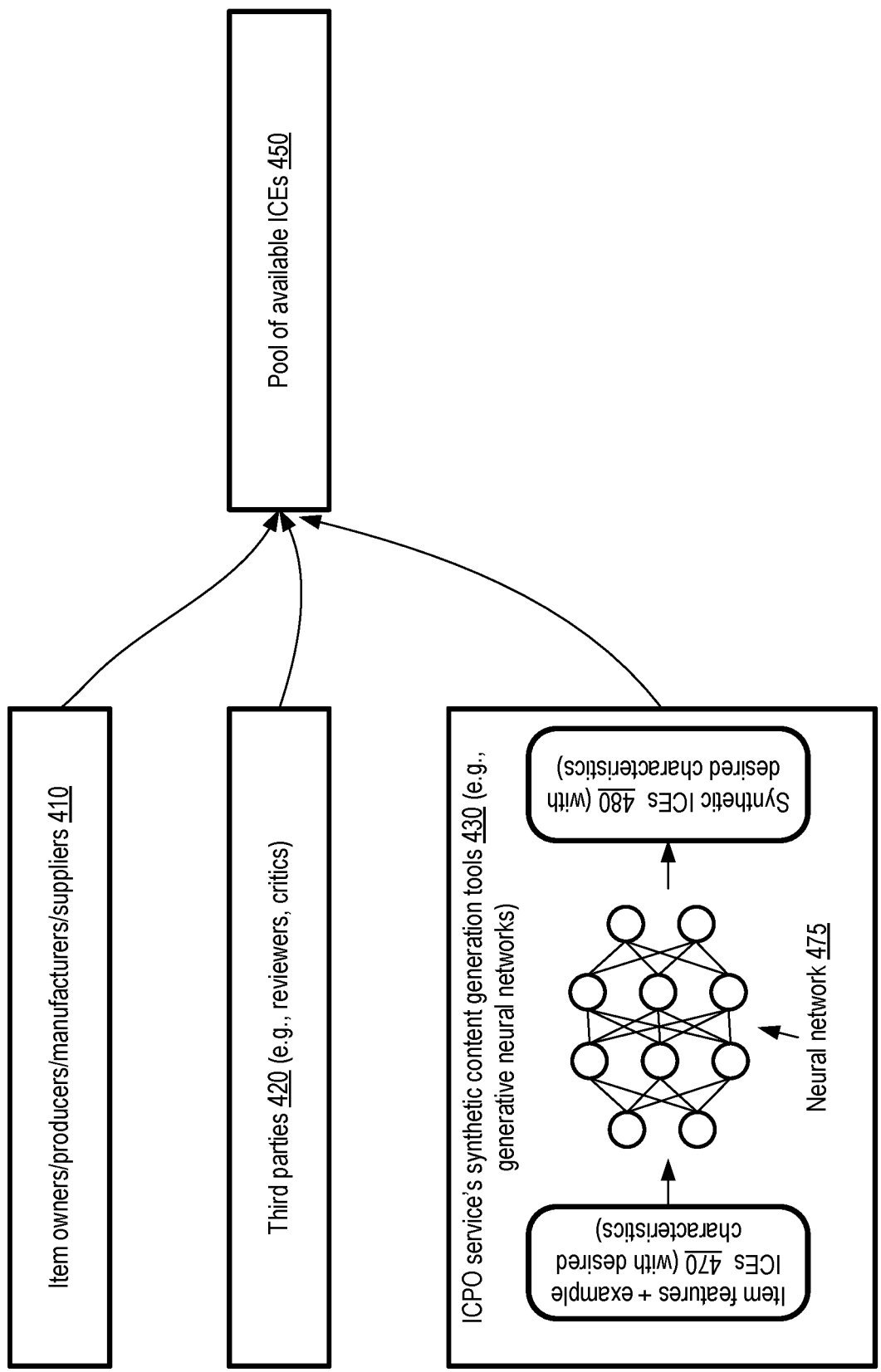
FIG. 4 illustrates example sources of informational content elements, according to at least some embodiments.

FIG. 4 illustrates example sources of informational content elements, according to at least some embodiments. In the depicted embodiment, the pool of available ICEs 450 for a given item of an inventor may originate from three broad categories of sources. The producers, suppliers or owners 410 of an item may comprise a primary source of ICEs in some embodiments. For example, a company that manufactures an electronics item may provide various types of metadata for the item, including a number of images showing the item from various angles or viewpoints, as well as brief descriptions of the items, and such images and descriptions may be presented as ICEs 450. Similarly, in the case of books, CDs, records, films, television shows and the like, the publishers of content items may provide various types of visual, text-based, audio or video information which can potentially be used as ICEs.

For many types of items or products, information generated by trustable third parties 420 may be very significant contributors to the success or failure of the items in various embodiments. Professional and/or amateur reviewers and critics may voice their opinions, e.g., either directly at a set of web pages being used to sell an item, or via publications, blogs, and other opinion distribution mechanisms. Portions of such opinions may be used (after obtaining the necessary permissions from the authors, if required) as ICEs in various embodiments.

For some items, instead of or in addition to using ICEs generated by the item's producers or trusted third parties, the ICOS may create ICEs using synthetic content generation tools 430 in some embodiments. This option may be exercised if, for example, very little collateral information is available about a given item, or if the available ICEs are evaluated as being inadequate based on selected criteria in various embodiments. Such content generation tools, which may for example include generative neural network models, may take a representation of the item's features and/or one or more example ICEs for similar items as input 470, learn the desired characteristics of ICEs such as images (or even text descriptions) using one or more neural networks 475, and generate synthetic ICEs with the desired characteristics representing the items in at least some embodiments. In some embodiments, new cover images for books or other content may be created using such techniques, for example. In some embodiments, item features input to the generative model 470 may be extracted from the item itself—e.g., images within a book may be used as possible starting points for a new image for the cover, or text extracted from the item may be interpreted to obtain a starting image. In at least one embodiment, the effectiveness of the synthesized content may be evaluated using a machine learning model similar to the model used for baseline ICE set identification, and/or the set of desirable features may be identified using such a baseline identification model. In different embodiments, the extent to which the synthetic content is original may differ—e.g., some new image ICEs may be generated by transforming existing images (by cropping, rotation, color change or the like) and/or combining existing images, while others may be created from scratch. Synthetic ICEs comprising any desired combination of several types of content (e.g., images only, images+text, video only, video+text, audio only, audio+text) may be generated in different embodiments. In some embodiments, synthetic ICEs may be generated during the online exploration phase of the analysis, e.g., in addition to or instead of being generated prior to the identification of the baseline set of ICEs.

Optimization Workflow Overview

Figure 5:
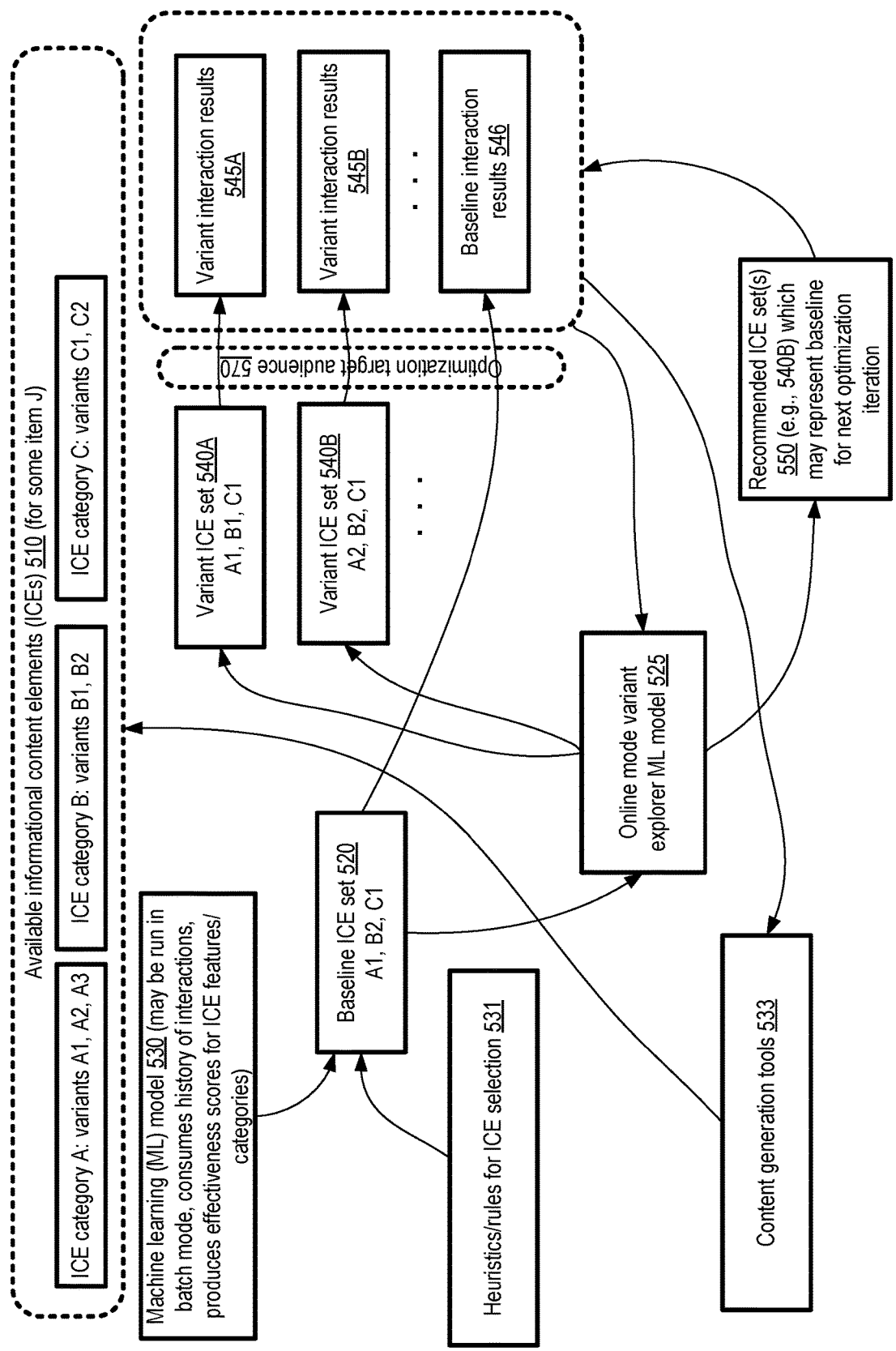
FIG. 5 illustrates aspects of an example high-level workflow for optimizing presentation of informational content elements, according to at least some embodiments.

FIG. 5 illustrates aspects of an example high-level workflow for optimizing presentation of informational content elements, according to at least some embodiments. In the depicted example, to simplify the explanation, for a particular item J of an inventory, a small set 510 of ICEs is assumed to be available for presentation in a particular presentation context. The available ICEs (some of which may have been generated by item suppliers/producers or third parties and provided to the ICOS, while others may have been created at the ICOS itself using content generation tools 533 similar to tools 420 of FIG. 4) may comprise content elements of three categories A, B and C. For ICE category A, variants A1, A2 and A3 may be available. For ICE category B, variants B1 and B2 may be available, while for ICE category C, variants C1 and C2 may be available.

In the depicted example, a baseline ICE set 520 {A1, B2, C1} comprising one ICE of each of the three categories may have been identified for item J and the presentation context being considered. A machine learning model 530 (such as a regression model, a decision tree-based model such as a random forest model, and/or a deep learning model deploying convolutional neural networks or the like), trained using records of earlier interactions with items similar to J (or with J itself) to produce effectiveness or utility scores for different ICE features or ICE categories, may be used to identify the baseline set 520 in some embodiments. In some embodiments, such a machine learning model may be trained and/or run in batch or offline mode. In other embodiments, instead of or in addition to a machine learning model, a set of heuristics or rules 531 may be used to select the baseline set 520. In some embodiments, the optimization process with respect to a given item may be initiated by identifying a baseline set 520 at any of various stages of the item's lifecycle within the inventory—for example, when the item is first introduced into the inventory, or after some period of time during which one or more un-optimized ICEs associated with the item may have been presented to an audience of potential consumers.

A variant explorer machine learning model 525, running in online mode rather than batch mode, may generate one or more variants 540 of the baseline set in the depicted embodiment. For example, variant ICE set 540A may comprise {A1, B1, C1}, while variant ICE set 540B may comprise {A2, B2, C1}. The effectiveness of the three combinations if ICEs—the baseline set 520, variant 540A and variant 540B—may be evaluated by presenting the combinations of a selected optimization target audience 570 in the depicted embodiment. The respective effectiveness results 545A, 545B and 546 of the two variants and the baseline set (based on the interactions of the target audience 570 with the presented ICEs) may be used by the variant explorer to select a recommended ICE set 550 (e.g., the ICEs of variant 540B) which may represent a new baseline set for the next iteration of variant exploration and optimization in some embodiments. In some embodiments, a bandit model which updates its parameters based on ongoing results may be employed as the variant explorer as discussed above. In other embodiments, a reinforcement learning algorithm may be used. The process of iterative optimization may be continued, with new effectiveness results generated in each iteration potentially being used to gradually improve the targeted objectives of the inventory owner with respect to the item J. In at least some embodiments, at least a subset of the records of the interactions of the target audience 570 with the variants (and/or the effectiveness results 545A, 545B or 546 derived from such records) may serve as feedback signals to the content generation tools 533 as well—that is, new ICE variants may be generated based at least in part on the results of the explorations, and such new ICE variants may be used for further exploration iterations.

The target audiences 570 to which the baseline set 520 and its variants are exposed, and from which the effectiveness results are captured, may vary in different embodiments, based on the granularity at which optimization is desired with respect to item J. The target audience may, for example, comprise potential item consumers of a selected demographic or geographic group, or a single potential consumer, in some embodiments. In one embodiment, all potential consumers may be targeted, instead of restricting the optimization to an individual or a group. In some embodiments, the effectiveness results obtained by presenting ICEs in a particular context may be used to generate recommended ICEs for other contexts—e.g., if a particular version of a book cover image is found to be successful at increasing sales in a recommendation context, that same version may be recommended for an item overview page context as well. In at least one embodiment, if an optimized set of ICEs has been identified for a given presentation context, some or all of the ICEs of that optimized set may be used as part of the baseline set of ICEs for a different presentation context for which optimization is to be initiated. It is noted that in embodiments in which machine learning models are used both for baseline ICE set identification and for variant exploration/optimization, different sets of training data may be used for the two models. The baseline selection model 530 may be trained, for example, using a large set of records of earlier interactions for items that have been in the inventory for some time, while the online model variant ML explorer model 525 may learn from interactions with a relatively newly-introduced item for which not many records of earlier interactions are available. In some embodiments in which machine learning models are used for baseline ICE set identification as well as variant exploration, optimal or near-optimal combinations of ICEs may at least in some cases be identified more quickly than if the baselines were identified without using machine learning. In one embodiment, machine learning may be used for baseline ICE set identification, and the results achieved using the baseline may be close enough to a desired target level that no further optimization iterations may be required.

In various embodiments, implementations of each of the machine learning models used (e.g., to select the baseline set of ICEs, to explore variants, and/or to generate new ICEs) may, for example, include memory for storing input values and parameters and computer-executable instructions for an initial set of computations on the input values. In some embodiments, intermediary layers of the model may include memory storing computer-executable instructions and/or data for manipulating the results of the initial computations and determining values to be transmitted to an output layer. The output layer may in turn include memory and/or computer-executable instructions for generating and/or storing output values such as effectiveness scores. Any of a number of types of data structures may be used for storing data and/or implementing the algorithm logic, e.g., including various tree-based structures as well as data structures optimized for storing matrices, vectors, arrays, hash tables and the like.

Presentation Contexts

Figure 6:
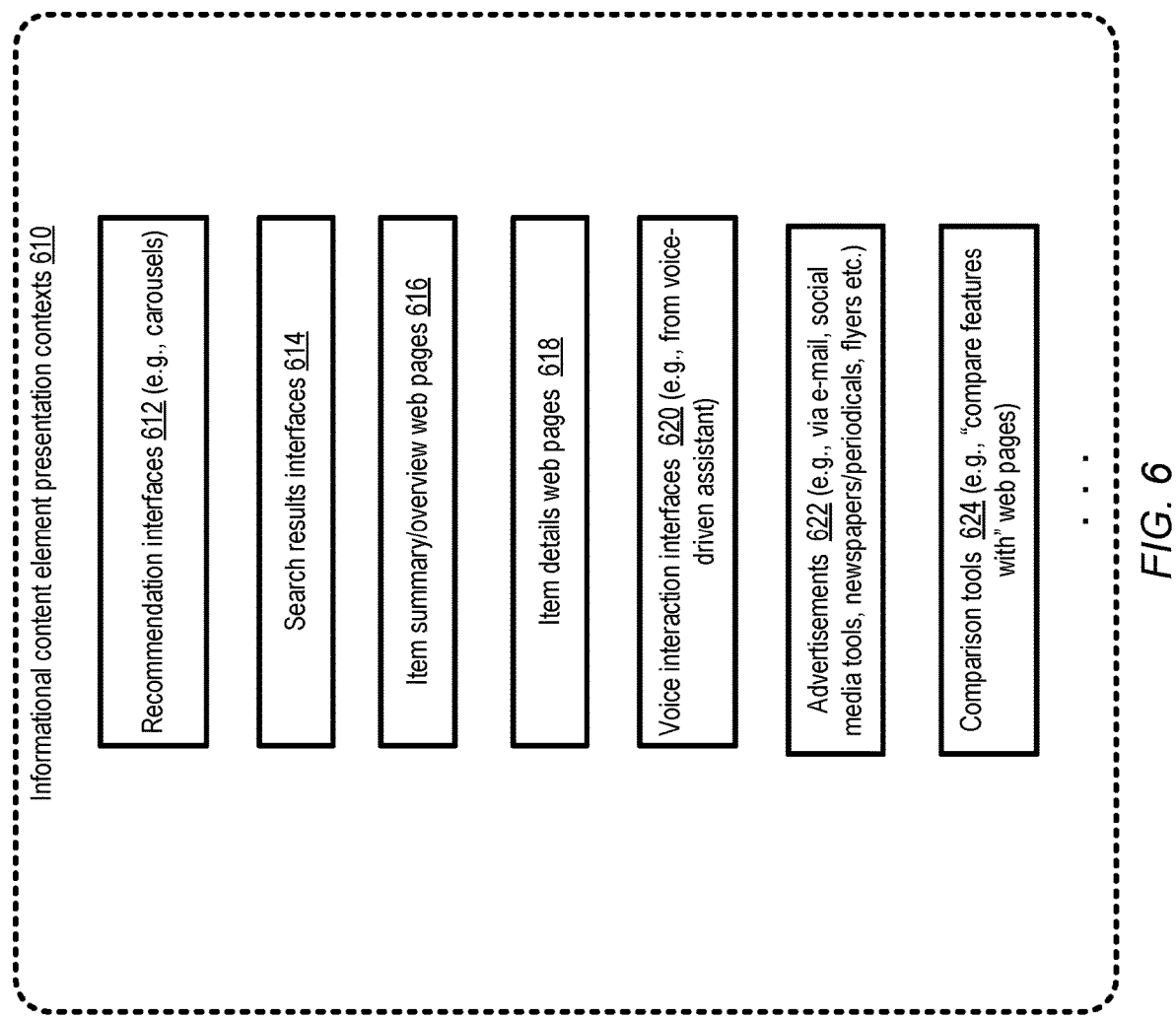
FIG. 6 illustrates example presentation contexts for informational content elements, according to at least some embodiments.

FIG. 6 illustrates example presentation contexts for informational content elements, according to at least some embodiments. In some embodiments, contexts 610 may include graphical recommendation interfaces 612, such as carousels comprising images of recommended items or lists of recommended items. Recommendation interfaces may include images, text and/or other forms of content in some embodiments.

Search results interfaces 614 may comprise another prominent mechanism for presenting ICEs in at least some embodiments. A number of different types of search tools may be used in different embodiments to submit queries about items in an inventory—e.g., text-based search (with or without auto-fill), image-base search and/or voice-based search may be supported, and each such tool may have a corresponding results interface for which ICE presentation may be optimized.

In scenarios in which items belong to an inventory of an e-retail (or e-wholesale) web site, item summary/overview web pages 616 and item details web pages 618 may represent additional opportunities for presenting ICEs associated with a given item in some embodiments. In at least one embodiment, a number of alternative layouts may be possible for arranging a set of ICEs within a given item overview web page 616 or item details web page 618. For example, the relative positioning of two images, or of an image and a text extract, may potentially be modified in different layouts. In some embodiments, in addition to exploring the effectiveness of different ICEs, the effectiveness of different layouts comprising the same set of ICEs may also be explored by an ICOS, with recommended layouts being identified as the output of a machine learning model.

In at least some embodiments, voice interaction interfaces 620 may provide another context in which ICEs are presented to potential item consumers. For example, a voice-drive assistant device may be used to present vocalized information about items of an inventory in response to specific queries and/or based on the assistant device owner's preferences. In one embodiment, ICE optimization may be performed for one or more forms of advertisements 622, such as advertisements sent via e-mails, social media tools, newspapers/periodicals, flyers and the like. In some embodiments, comparison tools 624, such as web pages which allow potential consumers to compare features of different items, may represent another presentation context for ICEs. ICE presentation optimization may be performed for one or more context not shown in FIG. 6 in some embodiments. In at least one embodiment, ICE presentation optimization may not necessarily be implemented for one or more of the contexts shown in FIG. 6.

Presentation Effectiveness Metrics

Figure 7:
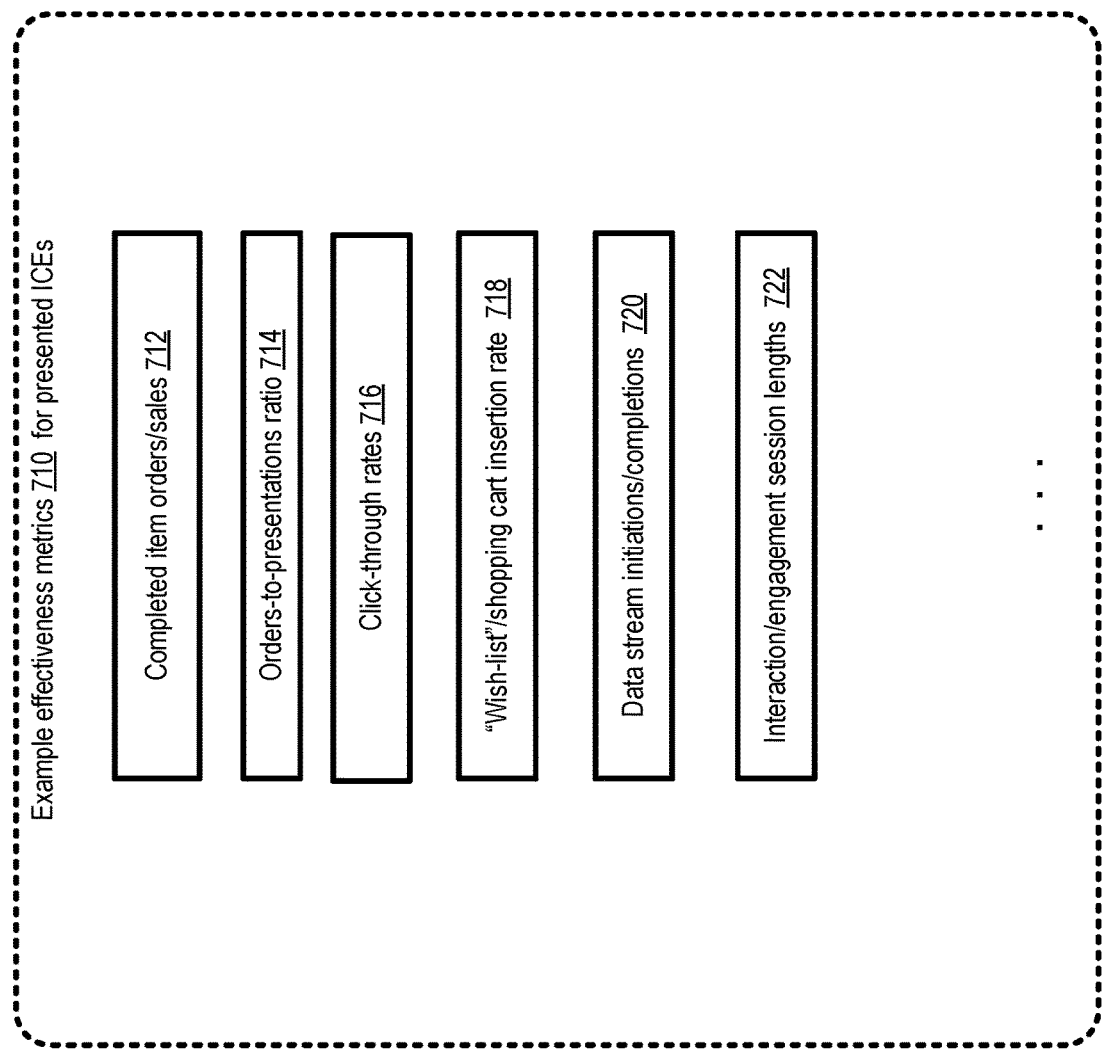
FIG. 7 illustrates example effectiveness metrics for presented informational content elements, according to at least some embodiments.

As mentioned earlier, in at least some embodiments, machine learning models may be used for identifying baseline sets of ICEs and/or for exploring variants from baseline sets. Such models may be trained to produce effectiveness metrics (which may also be referred to as utility metrics) of various kinds for features of the ICEs being considered. FIG. 7 illustrates example effectiveness metrics for presented informational content elements, according to at least some embodiments.

In some embodiments, the total number of completed sales or orders 712 over some time interval during which a particular set of ICEs was presented may be used as an effectiveness metric. In one embodiment, instead of using the absolute number of sales, the ratio 714 of orders or sales to presentations may be used as the metric.

In some embodiments, together with ICEs being presented, a link on which a potential item consumer may click to obtain additional information or to purchase the item may be provided, and the click-through rate 716 (the rate at which the link for a particular item was clicked on, or the ratio of clicks to presentations of the link) may be used as an effectiveness metric.

E-retail web sites may track how often a given item was inserted into a shopping cart (even if the item was not purchased shortly after such an insertion), or how often an item was added to a public or private "wish list" of a potential consumer. Such wish lists may be used to indicate that a potential consumer would like to obtain the inserted item, but will not necessarily purchase the inserted item immediately. Wish list insertions may, for example, serve as a signal to potential gift-givers regarding the consumer's preferences, or may simply be used as a temporary repository for items the consumer may purchase later. The rate 718 of insertion of an item into a wish list or a shopping cart maybe used as another effectiveness metric in some embodiments.

In some cases, one or more items of an inventory may not necessarily have to be purchased, but may be consumed in other ways—e.g., digitized books may be borrowed rather than bought, or films/videos may be streamed by a subscriber rather than purchased. In some embodiments, depending on the item consumption model, data stream initiations or completions 720 may be used as effectiveness metrics.

In one embodiment, the owner of the inventory may measure the lengths of the sessions during which potential consumers interact with a service provided by the owner, and such interaction/engagement session lengths 722 may be used as an effectiveness measure. Depending on the nature of the items and/or services being provided, for example, more advertisements may be presented during longer engagement sessions in some embodiments, so the length of the sessions may be tied to revenue.

Optimization Granularities

Figure 8:
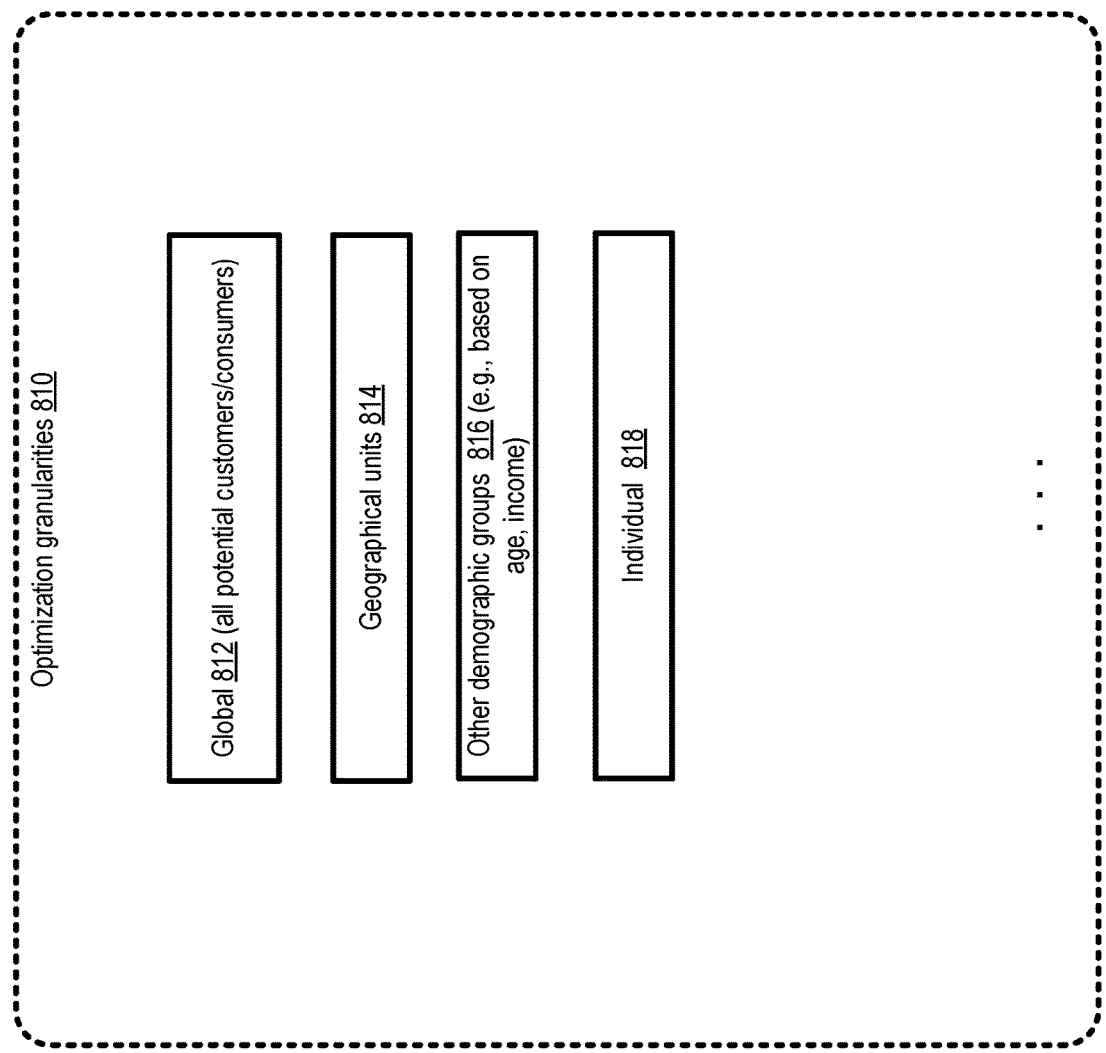
FIG. 8 illustrates example granularities at which the presentation of informational content elements may be optimized, according to at least some embodiments.

FIG. 8 illustrates example granularities at which the presentation of informational content elements may be optimized, according to at least some embodiments. As shown, the granularities 810 may include, among others, a global granularity 812, geographical units 814, other demographic groups 816 and/or individual granularity 818 in the depicted embodiment.

When optimization is performed at a global granularity 812, the target audience to which variants of ICE sets are presented may comprise any potential item consumers; as such, records of interactions of all consumers with the different variants being explored may be used to learn the effectiveness of the ICEs presented. In some cases, the popularity (and the reasons for the popularity) of at least some items may vary from one geographical region or country to another, and it may be possible to segregate the records of interactions with the different ICE versions geographically. In some such scenarios, in effect, respective machine learning models may be used for each geographical region of interest in various embodiments.

Other demographic groups 816, such as groups based on age, income, gender or the like may be used for separate optimization of ICE presentation in some embodiments. Finally, in at least one embodiment, the optimizations may be customized to the level of individual consumers 818—that is, a personalized optimal set of ICEs to be presented to respective individual consumers may be generated. In various embodiments, characteristics specific to the group or individual may be represented, for example, in the feature vectors used in the variant exploration model and/or a model used to identify a baseline set of ICEs. In some embodiments, model parameters learned for one demographic group or individual may be transferred or shared (at least as starting points in the exploration iterations) with other models for similar groups or individuals.

In various embodiments, the target audiences to which variants of ICEs are presented during optimization iterations may be selected based at least in part on the optimization granularity level selected. In some embodiments, peer groups of potential consumers may be identified for at least some potential consumers, so that it becomes easier to collect feedback when individual-level granularity is employed. That is, in such embodiments, the effectiveness of a given ICE set with respect to a given individual may be approximated using the effectiveness of that ICE set with respect to a set of peers identified for that individual. Other optimization granularities that those shown in FIG. 8 may be used in some embodiments.

Programmatic Interactions

In various embodiments, an informational content optimization service or tool may implement one or more programmatic interfaces to allow clients to submit various types of requests, receive response to those requests, and so on. Any of a number of different types of programmatic interfaces may be implemented in different embodiments, such as a set of application programming interfaces (APIs), web-based consoles, command line tools, graphical user interfaces and the like.

Figure 9:
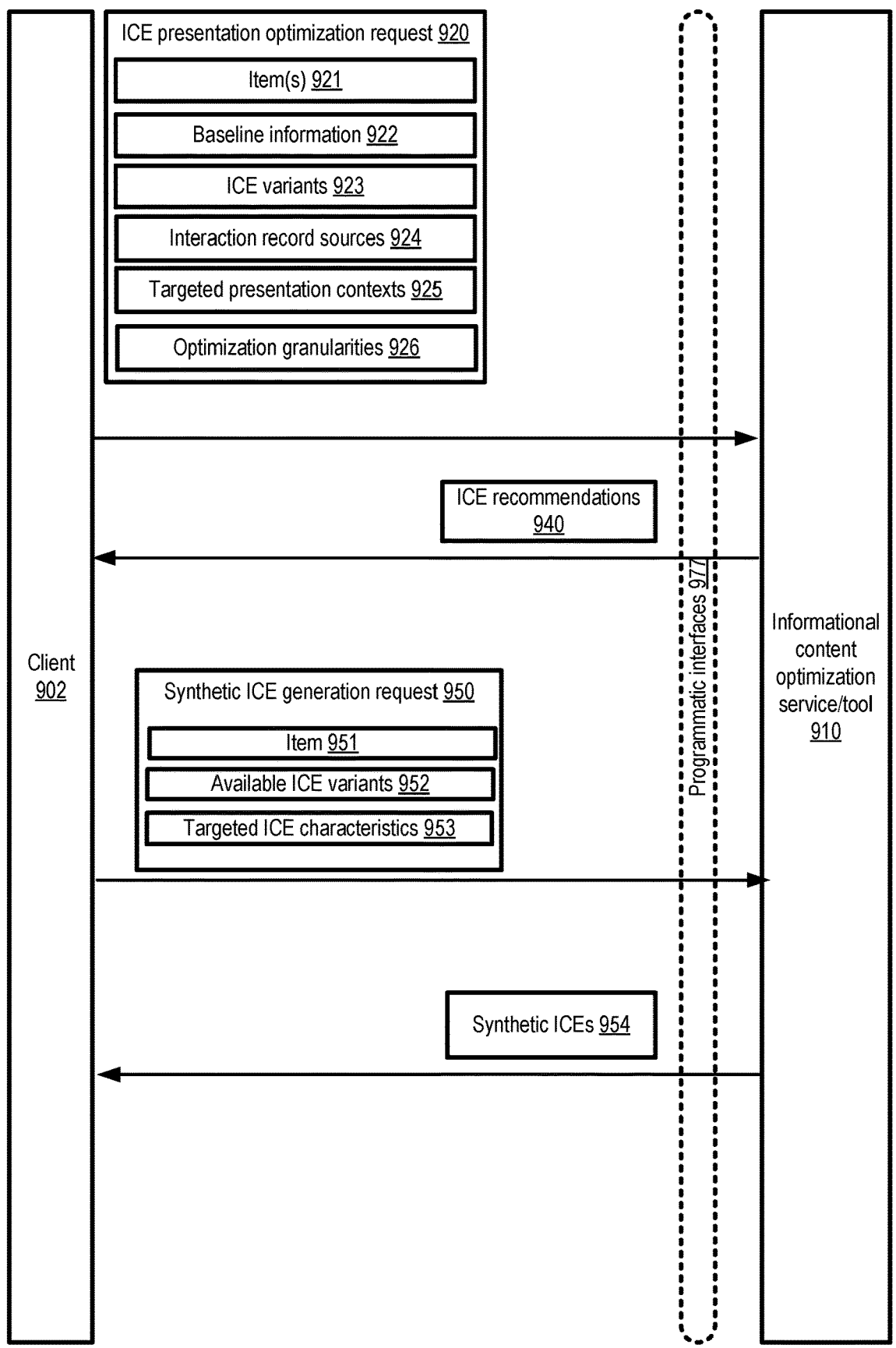
FIG. 9 illustrates example programmatic interactions between an informational content optimization service and its clients, according to at least some embodiments.

FIG. 9 illustrates example programmatic interactions between an informational content optimization service and its clients, according to at least some embodiments. Clients 902 may submit ICE presentation optimization requests 920 to the service or tool 910 via programmatic interfaces 977. A given presentation optimization request 920 may indicate the one or more items 921 for which content presentation is to be optimized; in some embodiments, a pointer to a database containing records of an inventory or a subset of an inventory may be provided in the request. The request 920 may indicate ICE baseline information 922 for the targeted items in various embodiments—e.g., the baseline set of ICEs for one or more presentation contexts may be indicated explicitly, rules/heuristics may be provided, or a directive to use a machine learning model to identify baseline ICEs may be provided. Information about the available variants of ICEs 923 of various categories and/or instructions on how to obtain ICEs for the items may be included in the request 920 in some embodiments—e.g., information on how to access a database of existing ICEs may be provided, or permission to generate/synthesize new ICEs may be granted. The interaction record sources 924 to be used to obtain effectiveness metrics for presented ICEs may be indicated in a request 920 in at least one embodiment. The presentation contexts 925 for which optimization is to be performed, and/or one or more optimization granularities 926 may be represented as parameters of request 920 in some embodiments.

In response to receiving such a request 920, the informational content optimization service or tool 910 may implement a workflow similar to that discussed in the context of FIG. 5 for the indicated items 921 in various embodiments, perform one or more optimization iterations and return a set of ICE recommendations 940 to the client 902. In some embodiments, ICE recommendations 940 may be provided iteratively—that is, in response to a given request 920, the service or tool 910 may recommend ICE sets several different times as it learns more about the effectiveness of the different variants tried.

In at least one embodiment, clients 902 may submit requests 950 to the informational content optimization service or tool to generate synthetic ICEs, e.g., if the set of available ICEs for a particular item is deemed insufficient by the client. Such a request 950 may, for example, include parameters indicating the target item 951 for which new ICEs are to be produced, the set of available ICE variants 952 (if any are available) of one or more ICE categories, and/or targeted ICE characteristics 953 (such as, for example, "bright colors" or "unusual font" in the case of a book cover image). In response to such a request, in some embodiments a machine learning algorithm such as an algorithm implemented using one or more generative neural networks may be employed to produce a set of synthetic ICEs 954 for the client.

Provider Network Environment

Figure 10:
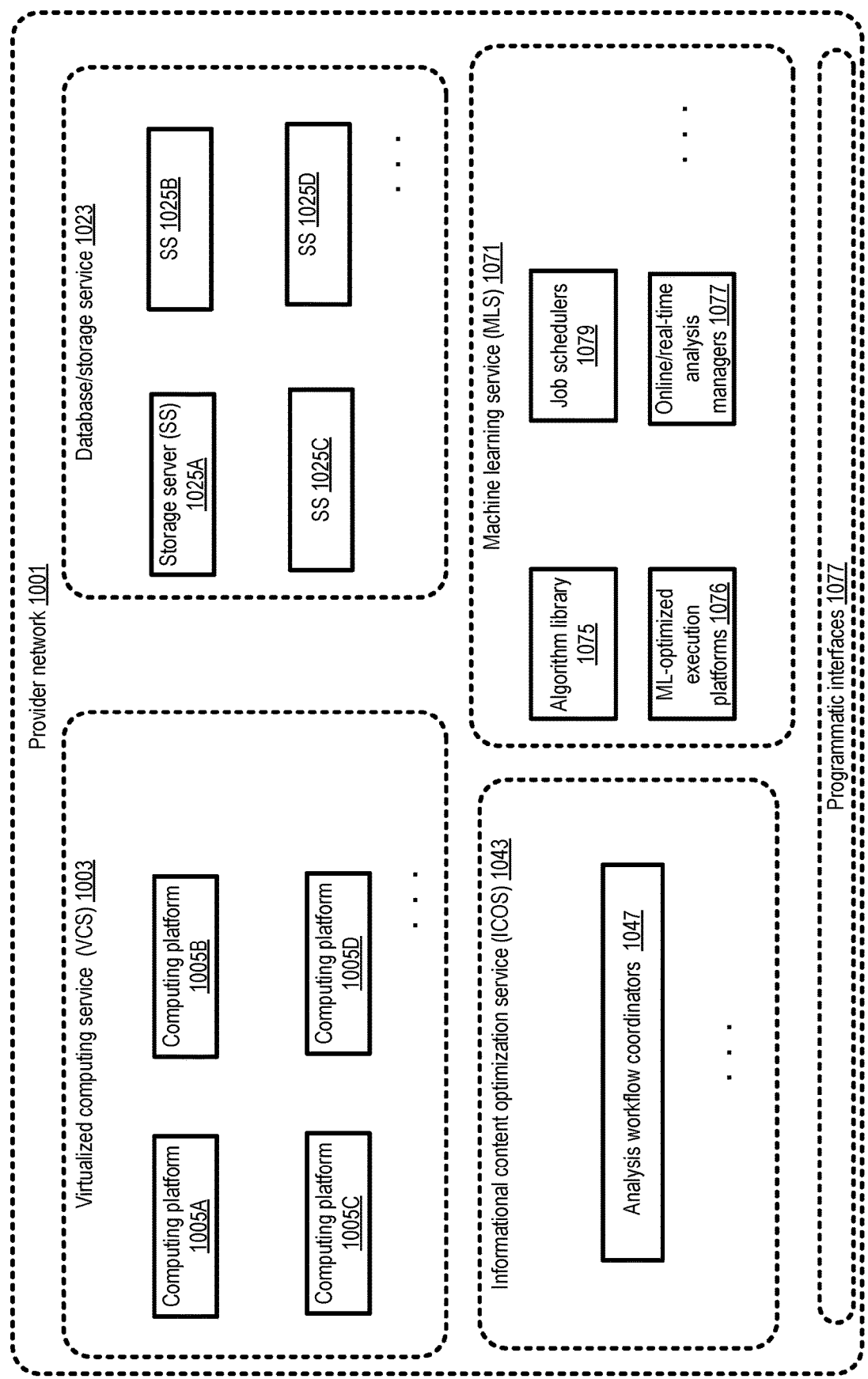
FIG. 10 illustrates a provider network environment at which an informational content optimization service may be implemented, according to at least some embodiments.

In some embodiments, the techniques discussed above for analyzing and improving informational content presentation may be implemented at a network-accessible service. FIG. 10 illustrates a provider network environment at which an informational content optimization service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

In the depicted embodiment, provider network 1001 may comprise resources used to implement a plurality of services, including for example a virtual computing service (VCS) 1003, a database or storage service 1023, a machine learning service (MLS) 1071 and an informational content optimization service (ICOS) 1043. In some embodiments, the ICOS 1043 may be implemented as a subcomponent of the MLS 1071. Components of a given service may utilize components of other services in the depicted embodiment—e.g., for some machine learning tasks, a component of the machine learning service 1071 may utilize virtual machines implemented at computing platforms such as 1005A-1005D of the virtualized computing service. Input data, intermediate results, final results and/or other artifacts of various machine learning algorithms or models, such as those used for identifying baseline ICE sets, identifying ICE recommendations, or generating synthetic ICEs may be stored at storage servers 1025 (e.g., 1025A-1025D) of the database or storage service 1023 in some embodiments. Individual ones of the services shown in FIG. 10 may implement a respective set of programmatic interfaces 1077 which can be used by external and/or internal clients (where the internal clients may comprise components of other services) in the depicted embodiment.

As shown, the informational content optimization service 1043 may comprise, among other components, one or more analysis workflow coordinators 1047 in the depicted embodiment. The analysis coordinators 1047 may, for example, invoke algorithms selected from the machine learning algorithm library 1075 to train and/or execute one or more models required to implement workflows similar to those shown in FIG. 5 in the depicted embodiment. In some embodiments, requests to train some types of machine learning models (such as some regression, decision tree-based, or deep neural network models which may be used to identify baseline ICE sets) may be handled as batch jobs at the machine learning service, and a batch job scheduler 1079 may orchestrate the allocation of resources for the jobs as well as dependencies among jobs. In the depicted embodiment, online/real-time analysis managers 1077 of the MLS 1071 may be responsible for executing the algorithms (such as bandit algorithms) used to explore the effectiveness of ICE variants. In at least one embodiment, a machine learning service 1071 may have access to or include a set of execution platforms 1076 that are optimized for machine learning tasks (e.g., platforms that have customized hardware such as GPU arrays and/or customized software stacks). Depending on the suitability of such platforms for ICE optimization-related tasks, one or more execution platforms 1076 may be employed for ICE optimization in the depicted embodiment.

In at least some embodiments, the workflows discussed earlier for ICE presentation optimization may be accomplished using non-specialized computing platforms of the virtualized computing service 1003. In various embodiments, the training and test/evaluation data used for various models for ICE optimization (and/or records of the item inventory and the ICE variants) may be stored at a database/storage service 1023. As mentioned earlier, the techniques for analyzing the effectiveness of ICEs and identifying recommended ICEs described above may be implemented without acquiring resources of network-accessible services such as those shown in FIG. 10 in at least some embodiments. For example, a standalone tool implemented at one or more computing devices which are not part of a network-accessible service may be used in some embodiments.

Methods for Optimizing Presentation of Informational Content

Figure 11:
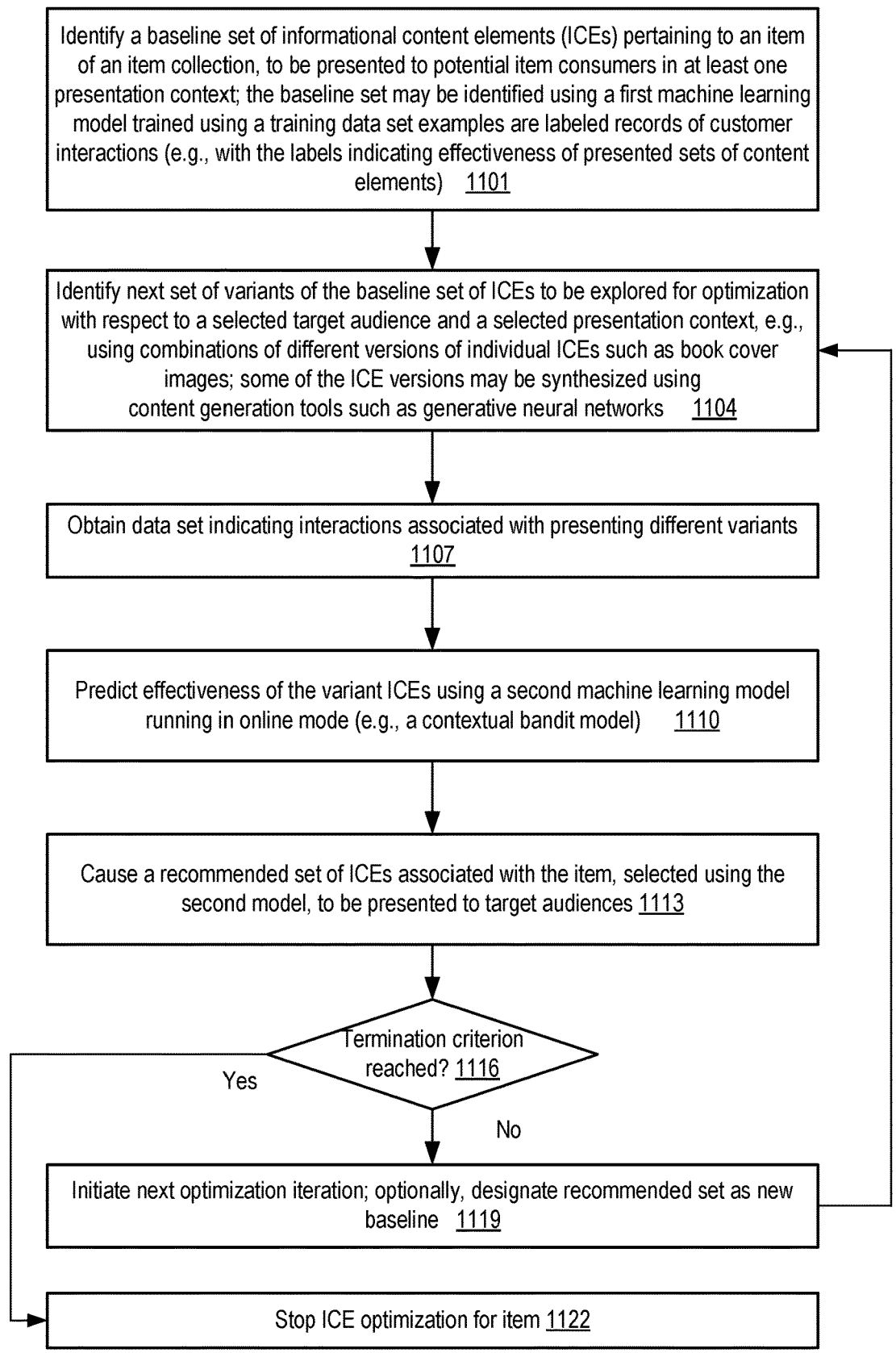
FIG. 11 is a flow diagram illustrating aspects of operations that may be performed to optimize the presentation of informational content elements, according to at least some embodiments.

FIG. 11 is a flow diagram illustrating aspects of operations that may be performed to optimize the presentation of informational content elements, according to at least some embodiments. As shown in element 1101, a baseline set of informational content elements (ICEs) pertaining to an item of an item collection, to be presented to potential item consumers in at least one presentation context, may be identified. A number of variant examples of one or more categories of ICEs, such as images, text snippets and the like, may be available for the item, from which some subset may be selected as members of the baseline set. In some embodiments, the baseline set may be identified using a first machine learning model trained using a training data set whose input examples include labeled records of customer interactions and features of ICEs presented during or prior to the interactions (e.g., with the labels indicating effectiveness results of previously-presented sets of content elements). In other embodiments, machine learning may not be used in selecting the baseline set of ICEs; instead, heuristics or rules (such as rules that result in the inclusion of the most recent versions of various categories of ICEs to be included in the baseline) may be used, or random selection may be used.

One or more iterations of variant exploration and optimization with respect to the ICEs presented may be initiated in the depicted embodiment. A set of variants of the (current) baseline ICEs may be identified in a given iteration (element 1104) for a given presentation context and a given target audience. For example, different versions of book cover images may be included in respective variant ICE sets in one embodiment, to be tried out in recommendation contexts for a selected demographic group of potential buyers/readers of the book. In one embodiment, one or more of the ICEs explored may be generated using content generation tools, e.g., instead of being selected from pre-existing ICEs provided by item producers.

The ICE variants may be presented to the target audience over some time period, and a data set indicating interactions of the target audience with the different variants may be obtained (element 1107) in some embodiments. Using the interaction results obtained from the variants as input to a second machine learning model, the effectiveness of various individual ICE variants may be predicted (element 1110). In some embodiments, a bandit model (such as a contextual bandit model) may be executed in an online or continuous prediction mode to generate the predictions. Any of a number of different effectiveness metrics may be used in the depicted embodiment, such as one or more of the metrics discussed in the context of FIG. 7. Using the results of the second model, a recommended set of ICEs for the item may be identified for one or more presentation contexts, and the recommended set may be presented at least to the target audiences for which the optimization iterations are being performed (element 1113).

An optimization goal or termination criterion may be identified in some embodiments, indicating the conditions under which the optimization iterations are to be discontinued. Example criteria may include, among others, when the net relative improvements in effectiveness achieved via one or more previous iterations fails to exceed some threshold, or when the absolute number of sales/consumption events for the item in a given timeframe falls below a threshold. If the termination criterion has not been reached (as detected in element 1116), the next optimization iteration may be initiated (element 1119) with new variants in the depicted embodiment, repeating operation corresponding to elements 1104 onwards. Optionally, the recommended set of ICEs of the previous iteration may be designated as the new baseline in some embodiments. If the termination criterion or criteria have been met (as also detected in operations corresponding to element 1116), further ICE optimization for the item being considered may be discontinued (element 1122).

It is noted that in various embodiments, some of the operations shown in FIG. 11 may be implemented in a different order than that shown in the figure, or may be performed in parallel rather than sequentially. Additionally, some of the operations shown in FIG. 11 may not be required in one or more implementations.

Use Cases

The techniques described above, of iteratively identifying recommended informational content elements for various inventory items and presentation contexts may be useful in a variety of scenarios. Many Internet-based retailing/wholesaling organizations, online auction organizations, libraries or subscription sites for video and/or text content may have very large inventories, running into millions of objects. Many different versions of collateral material, such as images, review text excerpts and the like may be available for a given item, especially an item such as a popular classic book with multiple published editions. In some cases, it may also be possible to synthesize or generate some of the collateral information, e.g., based on analyzing the relative success of presenting pre-existing content elements in the different contexts. Using machine learning-based optimization algorithms such as bandit algorithms as described, it may be possible to identify the right set of informational content elements to help achieve item consumption goals of the inventory owners at desired levels of optimization granularity—e.g., for different demographic or geographic groups of potential item consumers.

Illustrative Computer System

Figure 12:
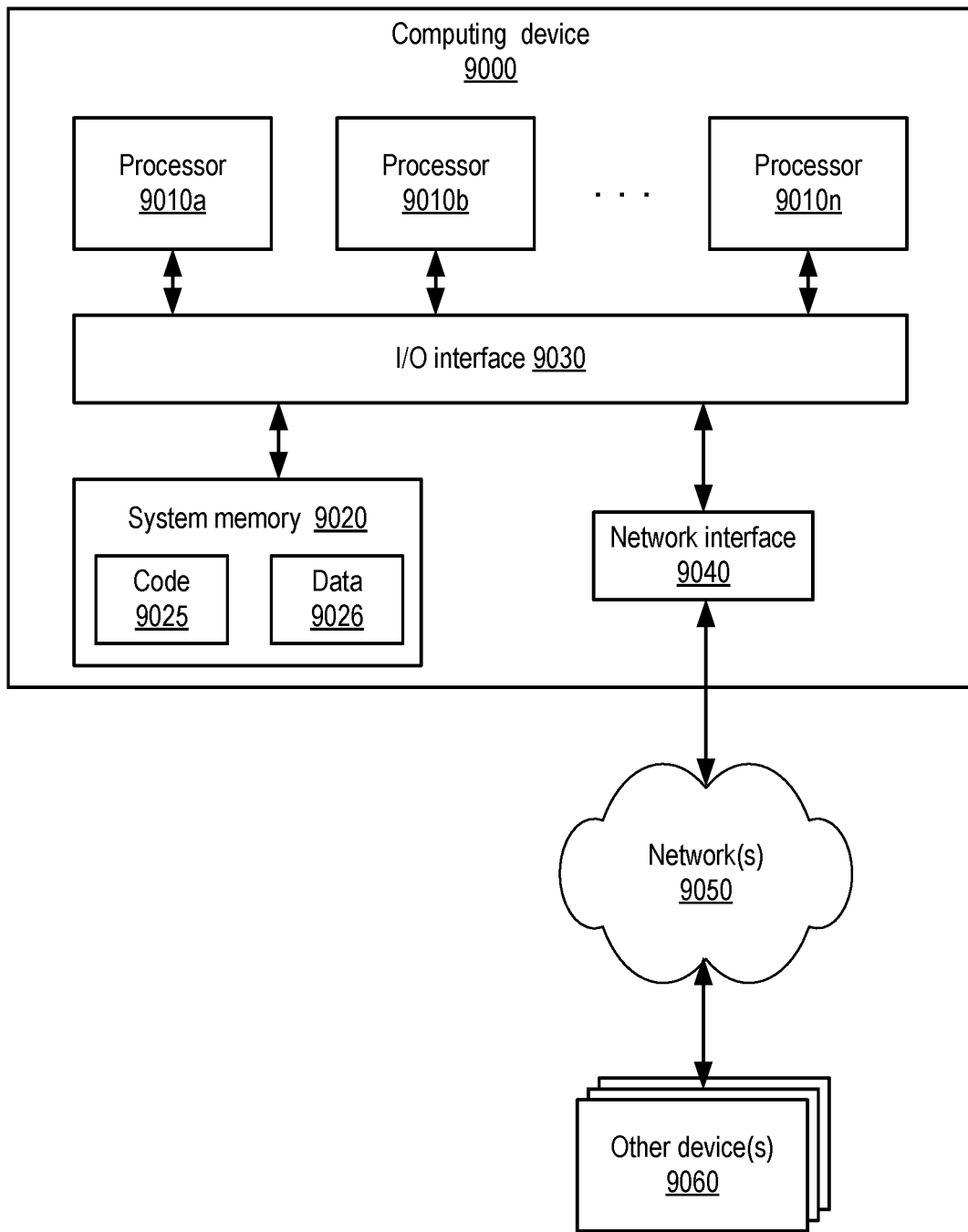
FIG. 12 is a block diagram illustrating an example computing device that may be used in at least some embodiments.

In at least some embodiments, a server that implements a portion or all of one or more of the technologies described herein, including the various components of an informational content optimization service such as workflow coordinators, baseline ICE set identifiers, variant explorers, synthetic content generators, trainers and executors of machine learning models, and the like may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030.

Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of an artificial intelligence service for optimizing presentation of informational content;
wherein the one or more computing devices are configured to:
train, using a first data set comprising records of interactions of item consumers with presentations of informational content elements pertaining to a plurality of items of an inventory of items accessible via a network, a first machine learning model to generate respective effectiveness scores of a plurality of informational content element features in one or more presentation contexts including at least a recommendation context, wherein the plurality of informational content element features comprise one or more image-based features;
identify, using a trained version of the first machine learning model, a baseline set of informational content elements pertaining to a particular item, wherein the baseline set is to be presented to one or more potential item consumers in a particular presentation context, wherein the baseline set comprises a first version of a first informational content element selected from among a plurality of versions of the first informational content element; and
perform one or more optimization iterations, wherein a first optimization iteration of the one or more optimization iterations comprises:
obtaining an additional data set comprising records of interactions, in at least the particular presentation context, of a first target audience with (a) the baseline set and (b) one or more variants of the baseline set, wherein a particular variant of the one or more variants comprises a second version of the first informational content element;
determining, using the respective additional data set as input to a second machine learning model operating in an online mode, a respective effectiveness metric corresponding to individual informational content elements with respect to the particular presentation context; and
causing a particular set of informational content elements to be presented to one or more potential item consumers in the particular presentation context, wherein at least one member of the particular set is identified using the second machine learning model.

2. The system as recited in claim 1, wherein the one or more computing devices are configured to:
generate, using a third machine learning model, at least a particular version of an informational content element included within one or more of: (a) the baseline set or (b) the one or more variants, wherein the third machine learning model comprises a generative neural network.

3. The system as recited in claim 1, wherein the second machine learning model comprises one or more of: a contextual bandit model, or a reinforcement learning model.

4. The system as recited in claim 1, wherein the first machine learning model comprises one or more of: a neural network model, a decision tree-based model, or a regression model.

5. The system as recited in claim 1, wherein the one or more computing devices are configured to:
select, from a plurality of optimization granularities comprising an individual-level granularity, a group granularity, and a global granularity, a particular optimization granularity at which presentation of informational content items is to be optimized for one or more items including the particular item, wherein the first target audience is selected based at least in part on the particular optimization granularity.

6. A method, comprising:
performing, by one or more computing devices:
identifying a baseline set of informational content elements pertaining to a particular item of an inventory of items accessible via a network, wherein the baseline set is to be presented to one or more potential item consumers in a particular presentation context, and wherein the baseline set comprises a first version of a first informational content element selected from among a plurality of versions of the first informational content element; and
implementing one or more optimization iterations, wherein a first optimization iteration of the one or more optimization iterations comprises:
obtaining a first data set comprising records of interactions, in at least the particular presentation context, of a first target audience with (a) the baseline set and (b) one or more variants of the baseline set, wherein a particular variant of the one or more variants comprises a second version of the first informational content element;
determining, using the first data set as input to a first machine learning model, a respective effectiveness metric corresponding to individual informational content elements with respect to the particular presentation context; and
causing a particular set of informational content elements to be presented to one or more potential item consumers in the particular presentation context, wherein at least one member of the particular set is identified using results of the trained version of the first machine learning model.

7. The method as recited in claim 6, wherein the first machine learning model comprises one or more of: a contextual bandit model, or a reinforcement learning model.

8. The method as recited in claim 6, wherein said identifying the baseline set comprises utilizing a second machine learning model trained using records of interactions of potential customers with presentations comprising informational content elements.

9. The method as recited in claim 6, wherein the particular presentation context comprises one or more of: a recommendation context, a search context, an item comparison context, an item overview context, or an item details context.

10. The method as recited in claim 6, wherein a first member of the particular set identified using results of the trained version of the first machine learning model comprises one or more of: (a) an image, (b) a collection of text, (c) a video, or (d) an audio recording.

11. The method as recited in claim 6, wherein the effectiveness metric comprises one or more of: (a) a web link click metric, (b) a sales metric, (c) a cart insertion metric, (d) a wish list insertion metric, or (e) a session engagement length metric.

12. The method as recited in claim 6, further comprising performing, by the one or more computing devices:
generating one or more synthetic informational content elements; and
including, within a particular variant of the baseline set, at least one synthetic informational content element of the one or more synthetic informational content elements.

13. The method as recited in claim 12, wherein said generating the one or more synthetic content elements comprises utilizing a machine learning model which includes a generative neural network.

14. The method as recited in claim 6, further comprising performing, by the one or more computing devices:
    determining, from a plurality of optimization granularities comprising an individual-level granularity, a group granularity, and a global granularity, a particular optimization granularity at which presentation of informational content items is to be optimized for one or more items, wherein the first target audience is selected based at least in part on the particular optimization granularity.

15. The method as recited in claim 6, further comprising performing, by the one or more computing devices:
    selecting the particular presentation context from a plurality of presentation contexts based at least in part on an analysis of records of interactions in one or more of the plurality of presentation contexts.

16. A non-transitory computer-accessible storage medium storing program instructions that when executed on one or more processors cause the one or more processors to:
    generate, using a machine learning-based content generator, one or more synthetic informational content elements pertaining to a particular item of a plurality of items of an inventory, wherein the one or more synthetic informational content elements comprise at least a first image;
    obtain a first data set comprising records of interactions of a first target audience with (a) a baseline set of informational content elements pertaining to the particular item and (b) one or more variants of the baseline set, wherein the baseline set does not include the first image, and wherein a particular variant of the one or more variants includes the first image;
    determine, using a first machine learning model to which the first data set is provided as input, a respective effectiveness metric corresponding to one or more informational content elements; and
    cause a particular set of informational content elements to be presented to one or more potential item consumers, wherein at least one member of the particular set is identified using results of the trained version of the first machine learning model.

17. The non-transitory computer-accessible storage medium as recited in claim 16, wherein the first machine learning model comprises one or more of: a contextual bandit model, or a reinforcement learning model.

18. The non-transitory computer-accessible storage medium as recited in claim 16, wherein the instructions when executed on the one or more processors cause the one or more processors to:
    utilize a second machine learning model to obtain the baseline set.

19. The non-transitory computer-accessible storage medium as recited in claim 16, wherein the instructions when executed on the one or more processors cause the one or more processors to:
    determine a particular presentation context from which the first data set is to be obtained, wherein the particular presentation context comprises one or more of: a recommendation context, a search context, an item comparison context, an item overview context, or an item details context.

20. The non-transitory computer-accessible storage medium as recited in claim 16, wherein a first member of the particular set identified using results of the trained version of the first machine learning model comprises one or more of: (a) an image, (b) a collection of text, (c) a video, or (d) an audio recording, and wherein the first member is generated using the machine learning-based content generator.

21. The non-transitory computer-accessible storage medium as recited in claim 16, wherein the instructions when executed on the one or more processors cause the one or more processors to:
    generate, based at least in part on the records of the interactions, one or more additional synthetic content information elements at the machine learning-based content generator.

* * * * *